T. O. CUTLER.
Ore Mill.

No. 12,054.

2 Sheets—Sheet 1.

Patented Dec. 12, 1854

Fig. 3. A. a.

Witnesses:
Wm H Bishop
Andrew DeLacy

Inventor:
T O Cutler

T. O. CUTLER.
Ore Mill.
No. 12,054.
2 Sheets—Sheet 2.
Patented Dec. 12, 1854.
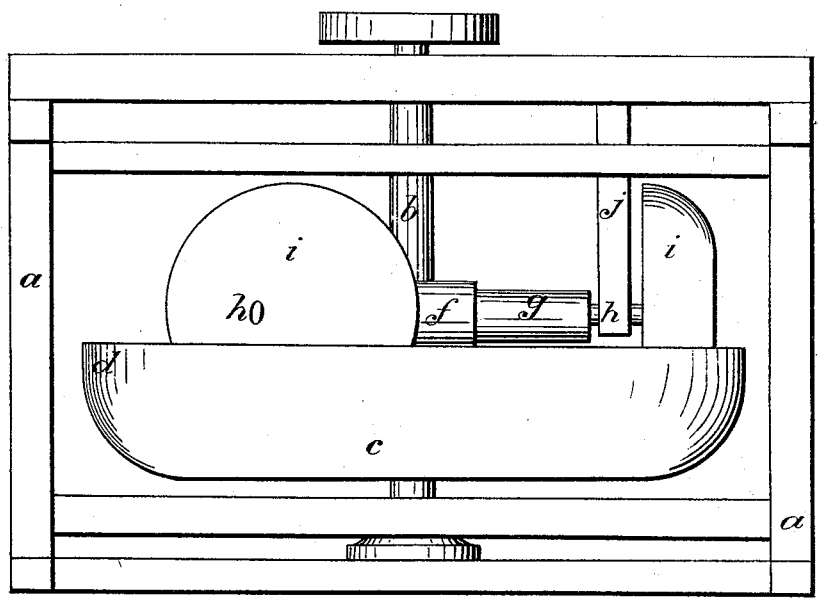
Witnesses:
Inventor:

UNITED STATES PATENT OFFICE.

THOMAS O. CUTLER, OF NEW YORK, N. Y.

IMPROVEMENT IN MACHINES FOR CRUSHING AND GRINDING MINERALS AND OTHER SUBSTANCES.

Specification forming part of Letters Patent No. 12,054, dated December 12, 1854.

*To all whom it may concern:*

Be it known that I, THOMAS O. CUTLER, of the city, county, and State of New York, have invented a new and useful Improvement in Machines for Crushing and Grinding Mineral and other Substances, of which the following is a full, clear, and exact description, reference being had to the accompanying drawings, making part of this specification, in which—

Figure 1:
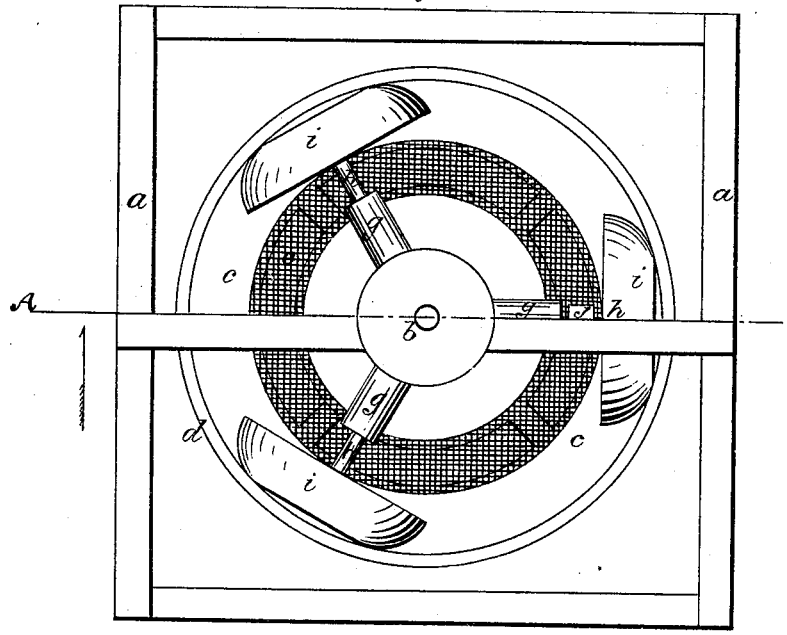
Figure 1:
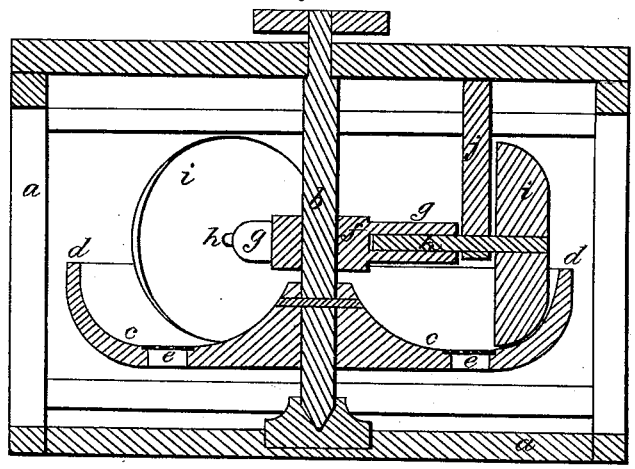

Figure 1 is a plan; Fig. 2, an elevation, and Fig. 3 a vertical section taken at the line A *a* of Fig. 1.

The same letters indicate like parts in all the figures.

In the said machine the mineral or other substance to be crushed, ground, or pulverized is supplied to the inside of a rotating pan, shell, or vessel placed on a vertical or nearly vertical shaft, with a rim the inner periphery of which presents a curved or beveled surface, against which the substance to be crushed is distributed and held by the centrifugal force imparted to it by the rotation of the pan; and my said invention consists in combining with such a rotating pan or shell a wheel or wheels rotating on an axis radiating, or nearly so, from the axis of the shell, the said wheel or wheels having a rounded or beveled tread to act against the rim, so that as the said pan rotates the plane of motion of the said wheel or wheels shall be tangent to a circle of less diameter than and form an angle with the plane of motion of the said pan or shell, and thus cause the tread of the wheel or wheels to have a grinding and slipping action against the inner face of the rim to reduce the substances there held by centrifugal action.

In the accompanying drawings, *a* represents the frame of the machine, and *b* a vertical shaft to receive motion from some suitable first mover. This shaft carries a pan or shell *c* near its lower end, which pan is flat at bottom and provided with a rim *d*, whose inner surface is curved to present in its cross-section a quarter of a circle, or nearly so. The bottom is provided with apertures *e*, covered with wire-cloth to act as sieves to permit the substances when sufficiently fine to pass through. The pan or shell thus constructed is secured to and rotates with the shaft. Above the hub of the pan there is another hub *f*, through which the shaft passes and in which it turns freely, and this hub is provided with three radial arms *g g g* with central bores, in which are fitted the spindles *h h h* of three wheels *i i i*, the peripheries of which run in the pan or shell *c*, the spindles being adapted to turn freely in the arms *g g g* and kept in place by one or more hangers *j*, attached to the frame and fitted with a suitable box for the spindles to turn in. There may be one such hanger for each spindle, and the boxes in the hangers should be slightly elongated to give play up and down to the wheels. The inner face of the wheels may be flat, as represented; but the tread from the inner to the outer face should be curved to correspond nearly with the curvature of the rim of the pan or shell. This curvature of the tread should be in the cross-section about a quarter of a circle, or nearly so.

The substance to be crushed or ground is supplied in any suitable manner to the inside of the pan or shell and distributed and held against the inner periphery by centrifugal force induced by the rotation of the pan, and the substance thus held is caught between the surface of the rim of the pan and the round or curved tread of the wheels and there gradually crushed and ground until it is sufficiently reduced to pass through the meshes of the sieves covering the apertures in the bottom of the pan; but if the sieves be not used the matter will be discharged through the apertures and sifted afterward, if required. If desired, the form of the tread of the wheels may be slightly modified and their spindles inclined instead of being placed at right angles with the axis of the shaft of the pan, or the rim and tread of the wheels may be beveled instead of being curved; but I prefer the mode of construction specified and represented in the drawings. If the weight of the wheels be not sufficient for some substances, the force may be increased either downward or outward by springs or weighted levers applied to the spindles in any suitable manner.

In the machine for which Letters Patent were granted to me, bearing date the 31st day of January, 1854, the substance to be crushed is distributed and held against the inner periphery of the rim of the pan by centrifugal force, as in the machine herein described, and there crushed by the action of balls rolling against the said periphery and having their plane of motion parallel with that of the pan;

but by the combination herein specified the action on the substance interposed between the rim and wheels is materially changed, because the plane of motion of the wheels is at right angles (more or less) with the plane of motion of the pan and tangent to a circle of less diameter than the rim, thereby producing a rubbing or grinding action between these surfaces very effective to the reduction of hard substances. I do not therefore wish to be understood as now claiming the invention of distributing and holding the substances to be crushed and ground against the periphery of a rim or shell by centrifugal force, or this broadly in combination with a body or bodies rolling against such substances, as this is fully described in the Letters Patent before named; but What I do claim as my invention, and desire to secure by Letters Patent, is—

Combining with the rotating pan or shell having a rim against which the substance to be crushed or ground is distributed and held by centrifugal force, substantially as herein described, one or more wheels with rounded or beveled treads and turning on axes radiating, or nearly so, from the axis of the pan or shell and whose planes of motion are tangent to a circle of less diameter than the rim of the pan, substantially as and for the purpose specified.

T. O. CUTLER.

Witnesses:
WM. H. BISHOP,
ANDREW DE LACY,
HENRY C. BANKS.